Nov. 12, 1968  C. A. HILBISH  3,409,966
METHOD OF PRODUCING BI-METAL BEARING SLEEVE
Filed April 22, 1966

INVENTOR
Charles A. Hilbish

United States Patent Office 3,409,966
Patented Nov. 12, 1968

3,409,966
METHOD OF PRODUCING BI-METAL BEARING SLEEVE
Charles A. Hilbish, Harrisburg, Pa., assignor to Bethlehem Steel Corporation, a corporation of Delaware
Filed Apr. 22, 1966, Ser. No. 544,501
2 Claims. (Cl. 29—149.5)

ABSTRACT OF THE DISCLOSURE

A method of producing, by fusion welding, a bi-metal bearing sleeve that has high resistance to both abrasion and impact strain.

---

This invention relates to a bi-metal bearing sleeve and a method of making it. It is particularly adapted for applications that require bearings that are both resistant to severe abrasion and to severe impact strains. This type of bearing is especially useful in earth moving machines, crushers, grinders, and other types of machinery or equipment that have moving parts that are subjected to severe impact.

Generally, metals that are high in abrasion resistance are relatively low in impact strain resistance; and conversely, others that are high in impact strain resistance are relatively low in abrasion resistance.

The object of the invention is to provide a method of producing a bearing sleeve that possesses both high resistance to abrasion and high resistance to impact strain.

Another object is to provide a method of producing a bearing sleeve with a cross section having a decremental change from high abrasion resistance to high impact strain resistance.

Another object is to provide a method of producing a bearing sleeve comprising two metals that have been fused to form an alloy at their line of jointure.

Other objects will become apparent from the following description and accompanying drawings which show a preferred embodiment of the invention, and in which.

Figure 1:
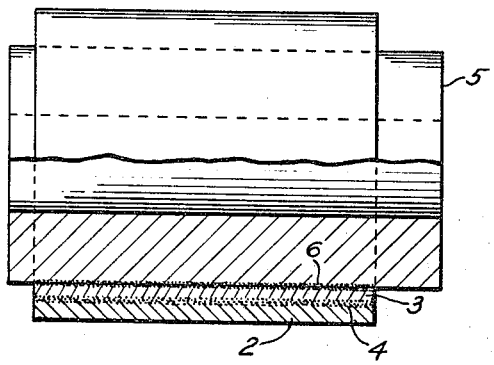
FIGURE 1 is an elevational view partly in section showing a partially completed bearing sleeve.
Figure 2:
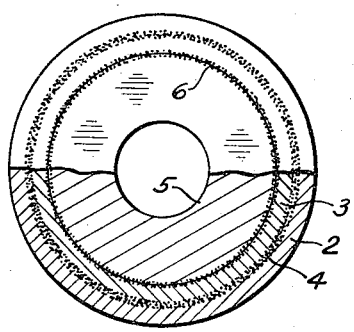
FIGURE 2 is an end view of FIGURE 1, partially in section.
Figure 3:
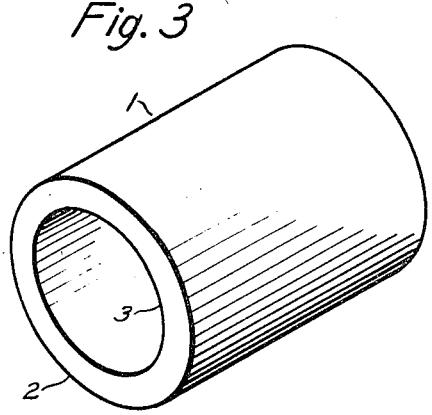
FIGURE 3 is an isometric view of a completed bearing sleeve.

The bearing comprises a layer of high abrasion resistance metal fusion welded to a layer of high impact resistance metal. The impact resistance metal thus acts as a cushion to absorb shock imparted to the abrasion resistance metal which is generally low in impact resistance.

A feature of my invention is the novel method of making the bi-metal bearing sleeve.

Referring to the drawings, the method comprises fusion welding a layer of metal 3 onto a low carbon steel tube 5 which has an outside diameter substantially smaller than the desired bore size of the bearing sleeve 1, fusion welding a layer of metal 2 onto the layer of metal 3, and then removing by machining the carbon steel tube in addition to all of the portion 6 which comprises fused metal of the carbon steel and metal 3. Thus the inner surface of the bearing sleeve 1 is undiluted metal 3. Sufficient quantity of metal 2 is deposited onto metal 3 so that the outer surface of the bearing sleeve 1 is undiluted metal 2.

A typical metal alloy suitable for metal 3 is a chromium-cobalt-tungsten alloy that is commonly used for hard-facing applications. This alloy is very high in resistance to abrasion. A typical metal suitable for metal 2 is an austenitic stainless steel alloy which is tough and high in resistance to impact. This combination of metals gives a bearing sleeve that has an abrasion resistant bore and an impact resistance outer layer. Metals 2 and 3 could be reversed to form a bearing sleeve with an abrasion resistant outside and an impact resistance bore. The intermediate alloy layer 4 form a strong bond between metals 3 and 2.

I claim:
1. Method of making a bi-metal bearing sleeve comprising an abrasion resistant metal, an impact resistant metal, and a fusion alloy of the two metals which comprises:
   (a) depositing by welding an abrasion resistant metal onto a low carbon steel backing,
   (b) depositing by welding an impact resistant metal onto said abrasion resistant metal,
   (c) removing by machining the low carbon steel backing and the fusion metal between the abrasion resistant metal and the steel backing.
2. The method of claim 1 wherein the abrasion resistant metal is an alloy of chromium-cobalt-tungsten and the impact resistant metal is austentic steel.

References Cited

UNITED STATES PATENTS

| 2,136,946 | 11/1938 | McCurdy | 29—149.5 |
| 2,074,007 | 3/1937 | Wissler | 29—423 X |
| 2,187,755 | 1/1940 | Ryder | 29—149.5 |
| 3,007,231 | 11/1961 | Garver | 29—529 X |

THOMAS H. EAGER, *Primary Examiner.*